April 15, 1969    E. J. RICKEL ET AL    3,438,454
AIR COOLING ARRANGEMENT FOR TRACTOR HAVING
OVERSIZED SINGLE FRONT WHEEL
Filed Feb. 15, 1967

INVENTORS
Edgar J. Rickel
Thomas D. Kernohan
BY *Seyfield, Kokjer, Seyfield & Lowe*
ATTORNEYS

United States Patent Office 3,438,454
Patented Apr. 15, 1969

3,438,454
AIR COOLING ARRANGEMENT FOR TRACTOR HAVING OVERSIZED SINGLE FRONT WHEEL
Edgar J. Rickel, Leawood, and Thomas D. Kernohan, Niles, Kans., assignors to Rickel, Inc., Kansas City, Mo., a corporation of Kansas
Filed Feb. 15, 1967, Ser. No. 616,395
Int. Cl. B62d 61/08; B60k 9/00
U.S. Cl. 180—54
2 Claims

ABSTRACT OF THE DISCLOSURE

The chassis frame is constructed with an upwardly offset forwardly projecting neck structure, below the forward end of which is pivoted a front wheel mounting yoke for carrying a large diameter, low soil pressure tire. The rearward, or base portion, of the neck structure, which screens the front of the engine housing, is provided with air passages therethrough permitting ingress of air for engine cooling purposes.

Summary of the invention

In the agriculture industry, application of liquid and solid fertilizers, lime, insecticides and herbicides has played an increasingly important part in increasing production and quality of field crops. The present invention is directed toward the provision of a self-propelled tractor especially suited for carrying field application spraying or broadcasting equipment.

One of the principal objects of the invention is to provide a self-propelled unit of the tricycle wheel type which is supported on large diameter "balloon" tires which produce a low soil loading and which can easily be maneuvered on muddy or soft fields without rutting or gouging tracks which later promote soil erosion. While use of "balloon" tires in such equipment is already practiced, many difficulties have been encountered, the principal ones constituting holding the over-all height of the tractor to a practical value while obtaining ease of steering. A single front wheel, with its substantial thickness and height, has posed problems in obtaining adequate air flow through the radiator for the engine coolant if the wheel is brought up close to the front of the engine, where it should be for optimum maneuverability and over-all strength. Thus, the prior art units have had to have abnormally high frames or special costly front wheel which add substantially to mounting the over-all weight and cost of the unit.

Our invention deals generally with the provision of a tractor chassis in which the foregoing problems are avoided by providing an overhead front wheel steering bearing on an axis which passes substantially vertically through the wheel and its area of contact with the ground, the bearing being supported from a frame which provides for adequate air flow to an engine which is supported on the frame behind the wheel. Through our arrangement, the profile of the frame is kept reasonably low and yet the tractor is easily steerable.

Description of the drawings

In the accompanying drawing, which forms a part of the specification and is to be read in conjunction therewith, and in which like reference numerals indicate like parts in the various views.

Detailed description

Figure 1:
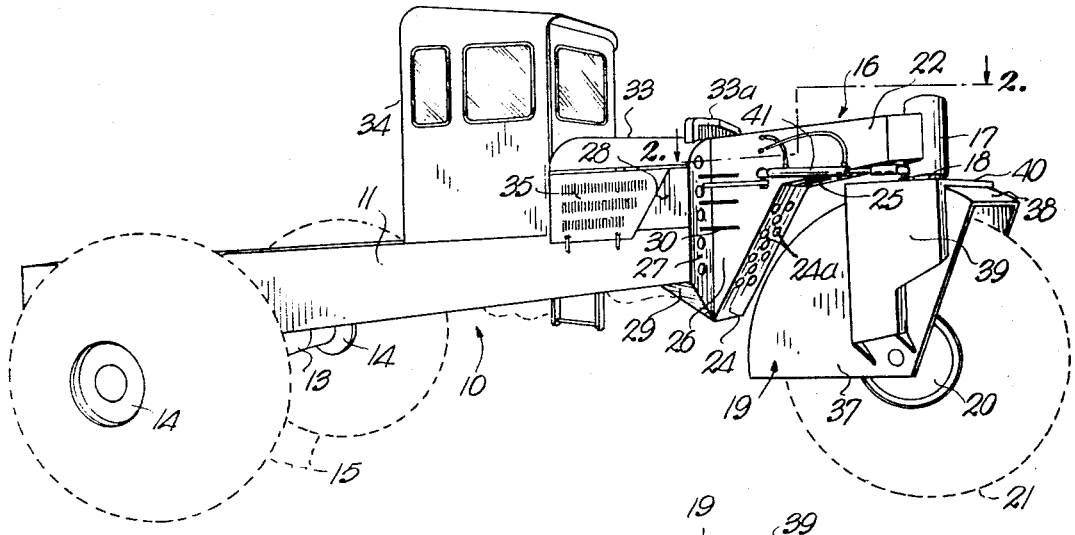
FIG. 1 is a perspective view of a tractor embodying a preferred form of the invention, the tires being shown in broken lines.
Figure 2:
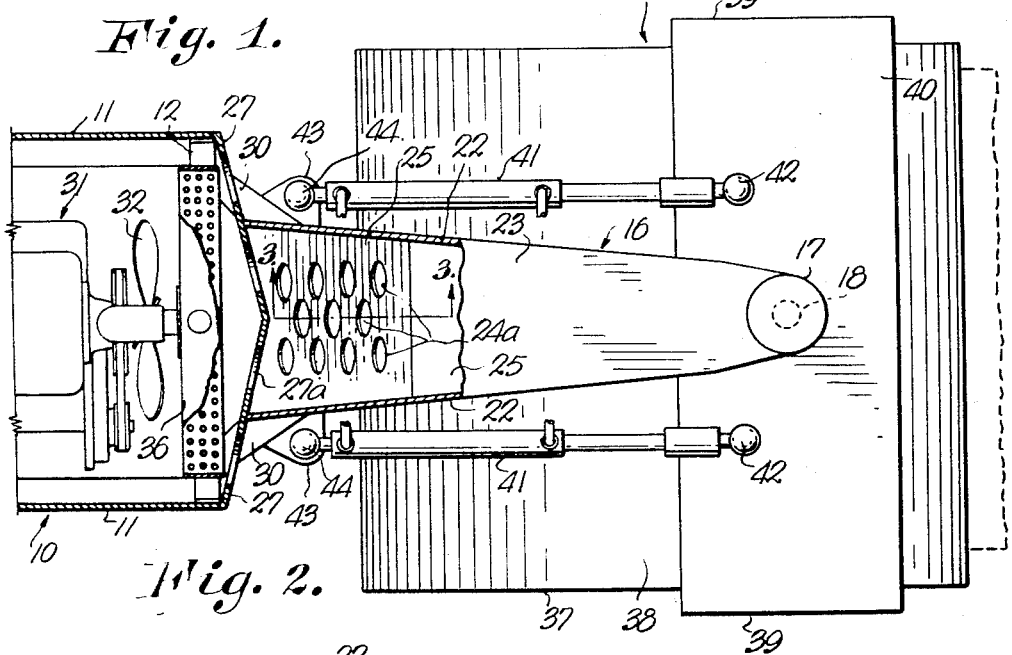
FIG. 2 is a fragmentary partly sectional view on a greatly enlarged scale, taken generally along line 2—2 of FIG. 1, in the direction of the arrows.
Figure 3:
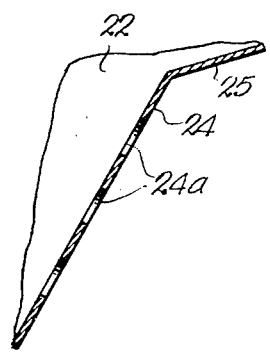
FIG. 3 is a fragmentary sectional view on a still further enlarged scale taken along the line 3—3 of FIG. 2 in the direction of the arrows.

Referring to the drawing, and initially to FIG. 1, reference numeral 10 indicates the main frame portion of the chassis. The frame comprises the substantially parallel side rails 11 (only one of which is seen in FIG. 1) which are joined at appropriate intervals along their lengths by cross beams or struts, as exemplified at 12 in FIG. 2. A rear axle 13 supports the rearward end of the frame and mounted to this axle are rear wheel hubs, as at 14, on which are mounted the rear tires 15. The tires are of the large diameter, "balloon" type which have a low soil compaction effect. A conventional heavy duty differential (not shown) forms a part of the rear axle and this differential is supplied with power from a drive shaft of conventional type which in turn is driven from an internal combustion engine later to be described.

The forward end of the chassis frame is constructed to provide a special neck structure terminating in a forwardly projecting portion 16 which carries at its outer end the bearing 17. This bearing receives an upright pin 18 which is secured to and projects upwardly from the center of a combined hood and wheel yoke assembly 19, later to be described, which carries the front wheel hub 20 on which front tire 21 is mounted. The bearing 17 is a combined thrust and rotary bearing and may be of any conventional design permitting free turning of the assembly 19 about the axis of pin 18.

The neck structure comprises a hollow box-like arrangement having the forwardly extending side panels 22, top plate 23, front panel 24 and bottom plate 25. These plates are joined at adjacent edges to provide a rearward portion 26, generally triangular in side elevation, and the forward neck portion 16. The rearward side edges of side panels 22 are fastened to plates 27 which in turn are respectively fastened on the chassis fore and aft centerline to each other and at their respective outer edges to the forward ends of the frame side rails 11 to provide a rigid plate assembly. Gussets 28 in each case join the upper portions of the front plates to the frame rails with which they are associated. Lower gussets 29 connect the lower edges of the rails with the lower portions of the front plates 27. The front plates 27 are also connected with the side panels 22 by the triangular, horizontally disposed vertically spaced gussets 30. The joints between the foregoing components are preferably all made by continuous welds.

Mounted on the frame by appropriate motor mounts (not shown) and directly behind the base of the front wheel neck structure is a conventional internal combustion engine 31 having the fan 32. The engine is positioned within an engine housing having the hood 33 which extends back to an operator's cab 34. Louvered side panels 35 enclose the sides of the engine housing. A radiator 36 is positioned within the engine housing in front of the fan, the radiator being connected through appropriate tubing (not shown) with the engine block for circulation of coolant between the radiator and block in the usual fashion.

Air is channeled toward the fan 32 by the interior surfaces of the rearward portion 26 of the neck structure, the air being able to enter the neck structure through apertures 24a which are provided in the front panel 24, and the apertures 27a provided in the respective front plates 27. Apertures 27a are formed both in the concealed and exposed portions of plates 27. For channeling additional air into the engine housing, we have provided an air scoop 33a on the top and at the forward end of hood 33.

It will be understood that a conventional transmission interconnects the engine with the drive shaft earlier referred to so that power can be supplied from the engine to the rear wheels. The details of this arrangement are conventional and play no part in the present invention and thus will not be described in further detail.

The front wheel hood and yoke comprises a hood having the vertical side panels 37 and the arcuate top panel 38. A plurality of channel members are welded along their free edges to the side and top panels of the hood to form a reinforced yoke-like structure having side members 39 and a horizontal top member 40 to which the pivot pin 18 is secured. Steering of the front wheel is controlled by operation of a pair of double acting hydraulic cylinders 41, one to either side of the pivot pin 18, each cylinder having a piston pivoted to the yoke as at 42. The cylinders are respectively pivoted to brackets 43 by couplings 44, the brackets being secured to and extending from the side panels of the neck structure. Hydraulic fluid flow to and from the cylinders is controlled by appropriate valving responsive to operation of the steering wheel, but the details of the steering power source do not play a part in the present invention and hence will not be further described.

Since the pin 18 for the front wheel has its axis substantially passing through the center of the area of contact between the ground and the front wheel, the steering of the front wheel requires little applied power. At the same time, we have been able to obtain a relatively shallow vehicle profile, while assuring of adequate engineering cooling by providing the offset neck structure with its hollow apertured base portion. Visibility from the cab is good since there is little directly in front of the operator to interfere with his view of the field.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Having thus described our invention, we claim:
1. A tractor chassis comprising
a frame having a rearward end and a forward end, and including an upstanding transverse plate assembly at the front of the frame,
a neck structure forming a part of the forward end of said frame, said neck structure having a rearward portion connected with said plate assembly and an upwardly offset forwardly extending section secured to said rearward portion,
a wheel yoke positioned beneath said forwardly extending section,
means pivotally connecting said wheel yoke with said forwardly extending section near the outer end thereof,
an engine housing on said frame behind said plate assembly and rearward portion of said neck structure closed in part in front by said plate assembly,
fan means within said housing positioned to draw air from in front of said housing into the housing, and
air passage means through said rearward portion of said neck structure and said plate assembly to the interior of said housing whereby to permit air flow through said structure and assembly into the interior of said housing.

2. A tractor chassis as in claim 1,
said rearward portion of said neck structure having side panels, a top plate and a front panel, said front panel and plate assembly having apertures therethrough forming a part of said air passage means.

References Cited

UNITED STATES PATENTS

| | | | |
|---|---|---|---|
| 1,310,898 | 7/1919 | Snell | 180—54 |
| 2,358,663 | 9/1944 | Scott-Iversen | 180—54 |
| 2,436,757 | 2/1948 | Lewis | 180—20 |
| 2,442,563 | 6/1948 | Greiner | 180—20 |

FOREIGN PATENTS

| | | |
|---|---|---|
| 737,148 | 7/1943 | Germany. |

KENNETH H. BETTS, Primary Examiner.

U.S. Cl. X.R.

180—20, 27